United States Patent
Richardson

(10) Patent No.: US 7,895,213 B2
(45) Date of Patent: Feb. 22, 2011

(54) METHOD AND SYSTEM FOR PROVIDING CASCADED TRIE-BASED NETWORK PACKET SEARCH ENGINES

(75) Inventor: Nicholas J. Richardson, San Diego, CA (US)

(73) Assignee: STMicroelectronics, Inc., Coppell, TX (US)

( * ) Notice: Subject to any disclaimer, the term of this patent is extended or adjusted under 35 U.S.C. 154(b) by 337 days.

(21) Appl. No.: 11/973,917

(22) Filed: Oct. 11, 2007

(65) Prior Publication Data

US 2008/0046428 A1 Feb. 21, 2008

Related U.S. Application Data

(62) Division of application No. 10/658,901, filed on Sep. 9, 2003, now Pat. No. 7,299,227.

(51) Int. Cl.
*G06F 17/30* (2006.01)
(52) U.S. Cl. .................. 707/749; 707/704; 707/769
(58) Field of Classification Search ............... 707/3, 707/10, 704, 769, 749; 709/203, 238
See application file for complete search history.

(56) References Cited

U.S. PATENT DOCUMENTS

| | | | |
|---|---|---|---|
| 6,430,527 B1 | 8/2002 | Waters et al. | |
| 6,629,099 B2 * | 9/2003 | Cheng | 707/707 |
| 6,631,419 B1 * | 10/2003 | Greene | 709/238 |
| 6,691,218 B2 | 2/2004 | Brown | |
| 6,725,326 B1 | 4/2004 | Patra et al. | |
| 6,757,779 B1 * | 6/2004 | Nataraj et al. | 711/108 |
| 6,772,301 B2 * | 8/2004 | Cheng et al. | 711/159 |
| 6,792,423 B1 | 9/2004 | Jeffries et al. | |
| 6,836,771 B2 | 12/2004 | Brown | |
| 6,880,064 B1 | 4/2005 | Brown | |
| 6,928,430 B1 * | 8/2005 | Chien et al. | 707/769 |
| 6,934,795 B2 * | 8/2005 | Nataraj et al. | 711/108 |
| 7,702,630 B2 * | 4/2010 | Basso et al. | 370/392 |
| 2002/0146009 A1 | 10/2002 | Gupta | |

FOREIGN PATENT DOCUMENTS

| | | |
|---|---|---|
| EP | 1 544 757 A2 | 6/2005 |
| EP | 1 544 757 A3 | 6/2005 |

OTHER PUBLICATIONS

Jaehyung Park et al., "Parallelisation of trie-based longest prefix matching for fast IP address lookups," Electronics Letters, Dec. 5, 2002, vol. 38, No. 25, 2 pages.

Willibald Doeringer et al., "Routing on Longest-Matching Prefixes," IEEE/ACM Transactions on Networking, vol. 4, No. 1, Feb. 1996, pp. 86-97.

* cited by examiner

*Primary Examiner*—Shahid A Alam
(74) *Attorney, Agent, or Firm*—Lisa K. Jorgenson; William A. Munck

(57) ABSTRACT

A method for providing cascaded trie-based network packet search engines is provided. A search command is received at one of the network packet search engines. The search command comprises a specific search key. A determination of a longest prefix match based on the specific search key is made at the network packet search engine. A determination is made at the network packet search engine regarding whether the longest prefix match comprises an overall longest prefix match among the cascaded network packet search engines such that any of the cascaded network packet search engines may comprise the overall longest matching prefix independently of position relative to the other cascaded network packet search engines.

21 Claims, 2 Drawing Sheets

METHOD AND SYSTEM FOR PROVIDING CASCADED TRIE-BASED NETWORK PACKET SEARCH ENGINES

This application is a divisional of prior U.S. patent application Ser. No. 10/658,901 filed on Sep. 9, 2003 now U.S. Pat. No. 7,299,227.

TECHNICAL FIELD OF THE INVENTION

The present invention is directed in general to network routers and, more specifically, to a method and system for providing cascaded trie-based network packet search engines.

BACKGROUND OF THE INVENTION

Network routers for packet-based communications protocols such as Internet Protocol (IP) direct incoming information to the next neighbor along a route to the intended destination for the packet. To do this, typically each router along the route performs route address prefix (normally referred to as just "prefix") look-up operations on a prefix (or routing) table to determine the appropriate next hop address for the destination IP prefix. Such operations are generally performed by either an embedded network processor or, more commonly, a separate network search engine.

Originally the hardware for network search engines employed content addressable memory (CAM), a type of memory consisting of a bit comparator and two memory elements, one storing data and the other storing a compare mask. The CAM compares incoming data with the value stored in the data memory under the control of the mask value, which may be programmed to override the comparison result to "always match". In operation, a CAM-based network search engine functions by storing all prefixes of a routing table in a CAM array in a specific, prioritized order, with each prefix's associated next hop information stored in a corresponding location in another memory. During prefix look-up, a key is placed on the comparand (compare operand) bus of the CAM array and compared against all prefixes in the memory. The array of match results from all comparisons is sent through a priority logic unit to determine the highest priority match, with the winning match used to address the next hop memory from which the corresponding next hop information is read and returned.

More recently, software-based network search engines employing a general-purpose processor and a normal memory have been developed. Within such devices, the processor performs prefix searches with a series of memory read and comparison operations. The routing table prefixes and next hop information are typically stored in the memory in data structures built according to one of various software algorithms developed to reduce memory usage in storing the routing table and the number of memory accesses during look-up. For these purposes, a multi-bit trie and the corresponding algorithm are among the data structures and algorithms that achieve the best data compression with a bounded number of memory accesses for search operations.

A trie is a tree-based data structure built to represent binary strings, where each bit or group of bits in the string determines the direction taken among branches within the tree. A binary trie proceeds bit-by-bit and has at most two branches from each node, while a multi-bit trie consumes multiple bits at a time and has several branches at each node, each branch leading to the next level. The number of bits consumed or examined during branch selection at each node is referred to as a stride. A uniform width stride trie is a trie with all strides having the same width, except possibly the last stride, which may be the remainder of the prefix length after being divided by the stride width.

Generally, the multi-bit trie algorithm works by storing and retrieving prefixes in a uniform stride width trie, grouping all branches in the same level with the same parent stride value into a table, referred to as a trie table. At each level, the corresponding stride value provides an index into a trie table entry containing the information needed to get to the next level. A multi-bit trie has the advantage that prefixes with common high order bits (strides) will share the same parent trie tables, reducing the memory required to store the prefixes.

Routing table look-up is also performed in same width strides, with the value of the next level stride from the input search key (typically an IP address of 32 or 64 bits) decoded and processed together with the associated data field in the stride value's parent table entry. If a stored route with the same prefix stride value is determined to exist within the trie, an index is calculated using the information in the parent table, then the search continues using the table pointer and the calculated index to form an address leading to the next level trie table entry. If a match is not found, the search terminates without success. If a search reaches an end node and a match is found, the search is successful and the associated next hop information is read from the next hop table.

In conventional processing systems that operate as described above, multiple stored prefixes may match a single destination address that is used as the search key during a look-up operation. This is due to the fact that any n-bit prefix is defined to match the search key even if the search key is longer than the prefix, provided the complete n-bit prefix matches the first n bits of the search key. Thus, for example, a 2-bit prefix and a 16-bit prefix may both match a 32-bit search key if the 2-bit prefix matches the first two bits of the search key and the 16-bit prefix matches the first sixteen bits of the search key. In order to resolve multiple matches, therefore, the search engine selects only the data associated with the longest matching prefix when responding to the look-up operation.

However, selecting between multiple matches in this way fails to address the problem of matches found within multiple search engines. Continuing the above example, if the 2-bit prefix was in a first search engine and the 16-bit prefix was in a second search engine, both search engines would respond to the look-up operation, creating a conflict.

Current processing systems with multiple search engines solve this problem by requiring the network processor to perform separate searches within each search engine and then to determine which of the multiple responses to accept. However, this solution is unsatisfactory as it results in a significant increase in look-up time.

SUMMARY OF THE INVENTION

In accordance with the present invention, a method and system for providing cascaded trie-based network packet search engines are provided that substantially eliminate or reduce disadvantages and problems associated with conventional methods and systems.

According to one embodiment of the present invention, a method for providing cascaded trie-based network packet search engines is provided. The method includes receiving a search command at one of the network packet search engines. The search command comprises a specific search key. A determination of a longest prefix match based on the specific search key is made at the network packet search engine. A determination is made at the network packet search engine regarding whether the longest prefix match comprises an overall longest prefix match among the cascaded network packet search engines such that any of the cascaded network packet search engines may comprise the overall longest matching prefix independently of position relative to the other cascaded network packet search engines.

According to another embodiment of the present invention, a method for operating a network processing unit coupled to a plurality of network packet search engines is provided. The method includes sending a search command to the plurality of network packet search engines and receiving a response to the search command from a single one of the network packet search engines. The single network packet search engine comprises an overall longest prefix match among the plurality of network packet search engines independently of position relative to the other network packet search engines.

According to yet another embodiment of the present invention, a network packet search engine coupled to at least one other network packet search engine is provided. The network packet search engine is operable to receive a search command. The search command comprises a specific search key. The network packet search engine is also operable to determine a longest prefix match based on the specific search key, to determine whether the longest prefix match comprises an overall longest prefix match among the plurality of network packet search engines, and to respond to the search command based on the determination that the network packet search engine comprises the overall longest prefix match.

Technical advantages of one or more embodiments of the present invention include providing an improved method for providing cascaded trie-based network packet search engines. In a particular embodiment, a longest prefix match among multiple network packet search engines may be determined by the network packet search engines themselves. Accordingly, only the network packet search engine with the longest prefix match responds to look-up operation and storage requests from the network processing unit. As a result, the network processing unit does not have to resolve conflicts created by matches found within multiple network packet search engines, which decreases look-up time. In addition, the method allows for the maximization of memory utilization in response to storage requests from the network processing unit.

Other technical advantages will be readily apparent to one skilled in the art from the following figures, description, and claims.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
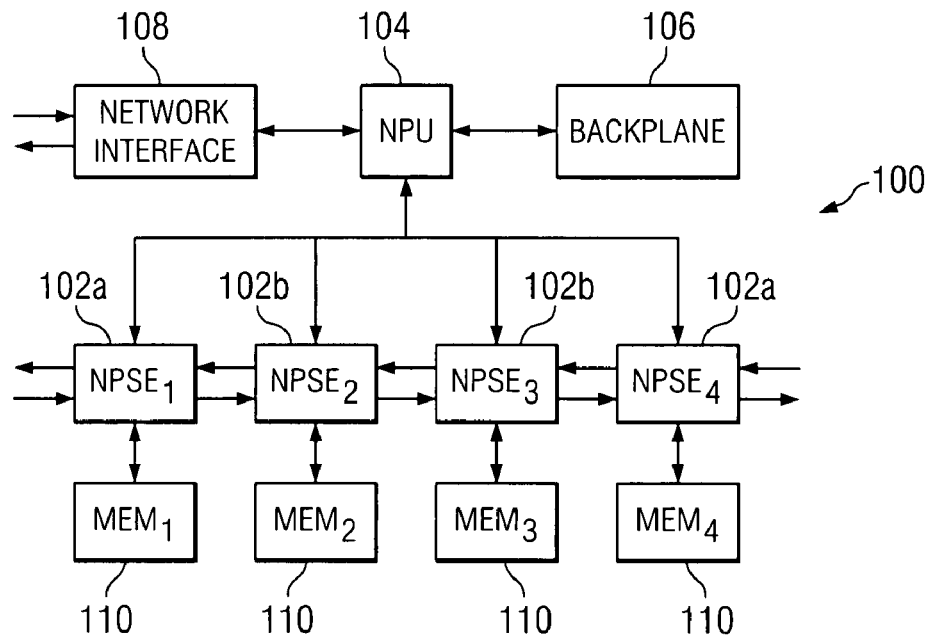
FIG. 1 is a block diagram illustrating a processing system comprising cascaded trie-based network packet search engines in accordance with one embodiment of the present invention.
Figure 2:
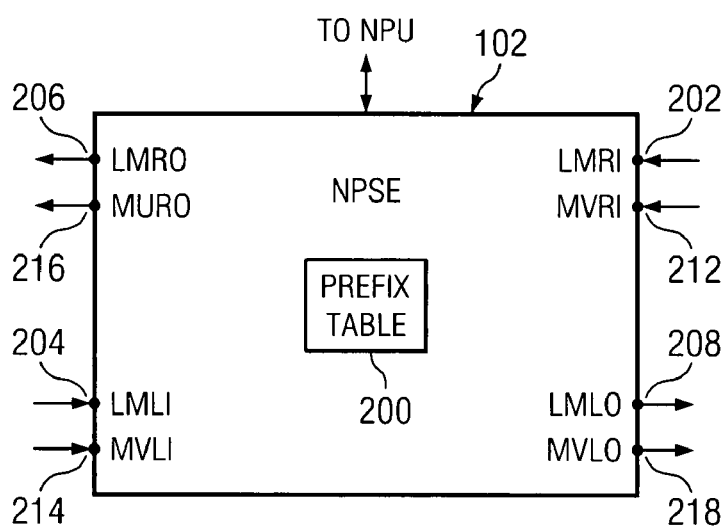
FIG. 2 is a block diagram illustrating one of the network packet search engines of FIG. 1 in accordance with one embodiment of the present invention.
Figure 3:
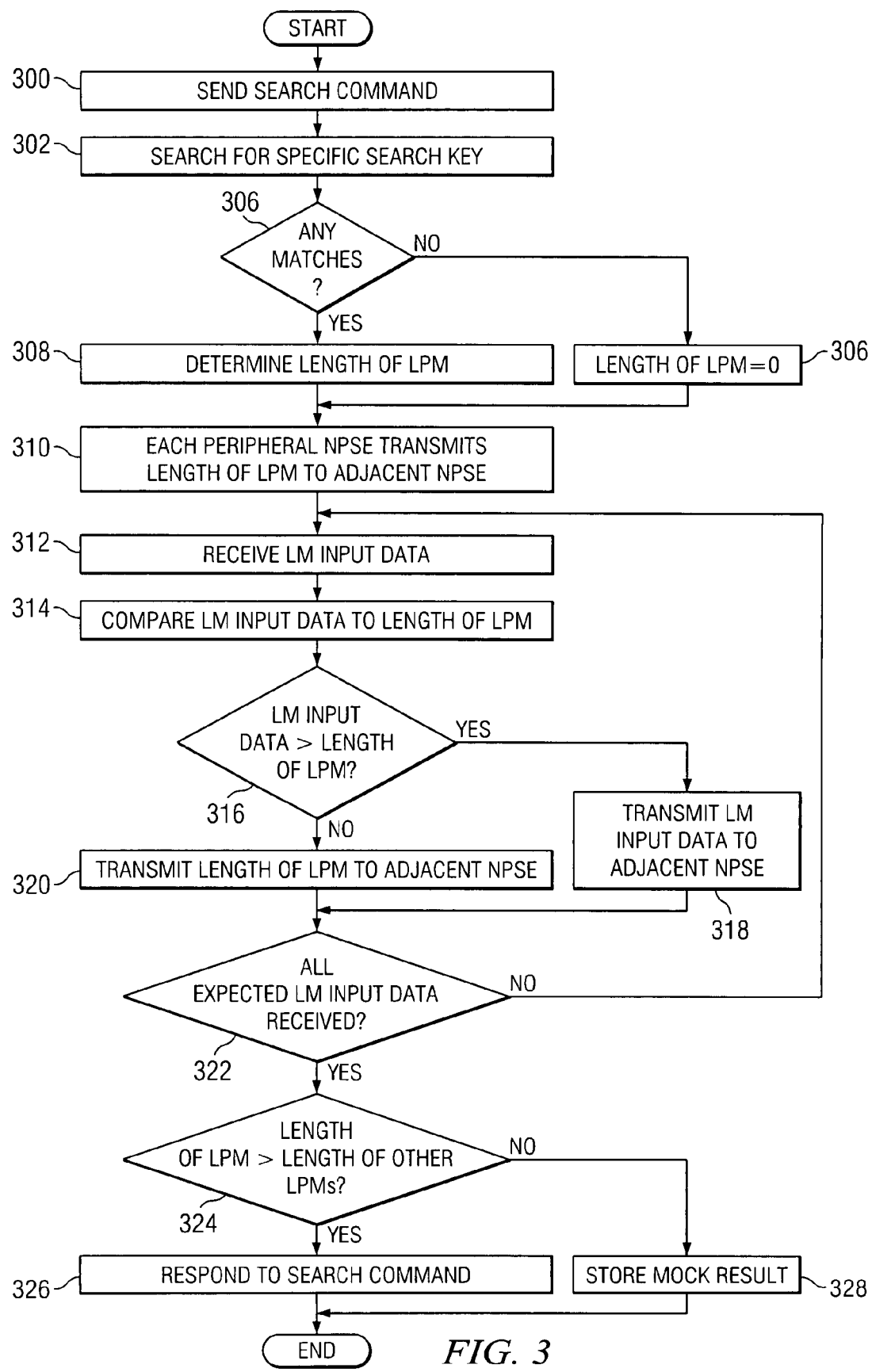
FIG. 3 is a flow diagram illustrating a method for providing the cascaded trie-based network packet search engines of FIG. 1 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

FIG. 1 is a block diagram illustrating a processing system 100 comprising at least two cascaded trie-based network packet search engines (NPSEs) 102 in accordance with one embodiment of the present invention. In addition to the network packet search engines 102, the processing system 100 comprises a system controller or network processing unit (NPU) 104, a backplane 106, a network interface 108, and external memories 110. According to one embodiment, the processing system 100 may implement a portion of an Internet Protocol (IP) network router.

The network processing unit 104 is coupled to the network packet search engines 102, which are each coupled to a corresponding one of the external memories 110. As used herein, "each" means every one of at least a subset of the identified items. The network processing unit 104 is also coupled to the backplane 106 and to a network through the network interface 108.

Each network packet search engine 102 is operable to receive addresses, commands and/or prefixes for the next hop address from the network processing unit 104 and to return the next hop address to the network processing unit 104. In order to perform these tasks, each network packet search engine 102 is operable to transmit data table memory addresses, together with a data pointer to the next hop address within a data table, to the corresponding external memory 110. In addition, each network packet search engine 102 is operable to receive the next hop address that is identified by the address and data pointer from the corresponding external memory 110.

As described in more detail below in connection with FIGS. 2 and 3, each network packet search engine 102 is operable to receive input data from and transmit output data to any adjacent network packet search engines 102 in order to determine the longest prefix match (LPM) among multiple network packet search engines 102. By communicating with the other network packet search engines 102, each of the network packet search engines 102 is operable to compare its longest prefix match with other matches that may have been found by other network packet search engines 102. The network packet search engine 102 that determines that it has found the longest prefix match may then respond to the network processing unit 104.

The network packet search engines 102 may comprise either peripheral network packet search engines 102a or central network packet search engines 102b. A peripheral network packet search engine 102a is coupled to only one adjacent network packet search engine 102, while a central network packet search engine 102b is coupled to two network packet search engines 102.

Although the illustrated embodiment comprises four network packet search engines 102, it will be understood that the processing system 100 may comprise any suitable number of network packet search engines 102 without departing from the scope of the present invention. Thus, for embodiments of the processing system 100 that comprise more than two network packet search engines 102, the processing system 100 comprises two peripheral network packet search engines 102a and the remaining network packet search engines 102 are central network packet search engines 102b. For embodiments of the processing system 100 that comprise only two network packet search engines 102, those network packet search engines 102 are peripheral network packet search engines 102a and the processing system 100 comprises no central network packet search engines 102b.

According to one embodiment, the network packet search engines 102 may be coupled to the network processing unit 104 by a high-speed 36-bit network processor unit interface and to the external memories 110 by high-speed 36-bit static random access memory (SRAM) interfaces. For this embodiment, each interface may be implemented by a quad data rate (QDR) architecture, with the network processing unit 104 as the master for the NPU interface and the external memories 110 as the slaves for the SRAM interfaces.

FIG. 2 is a block diagram illustrating one of the network packet search engines 102 in accordance with one embodiment of the present invention. The network packet search engine 102 is operable to receive input data from and transmit output data to any adjacent network packet search engines 102.

The network packet search engine 102 comprises at least one prefix table 200 that is operable to store prefixes for the network packet search engine 102. Each prefix stored in a prefix table 200 is operable to identify an address stored within the corresponding external memory 110.

The network packet search engine 102 also comprises a longest match right input (LMRI) node 202 for receiving the length of the longest prefix match found by the network packet search engines 102 to the right of the network packet search engine 102 and a longest match left input (LMLI) node 204 for receiving the length of the longest prefix match found by the network packet search engines 102 to the left of the network packet search engine 102.

The network packet search engine 102 also comprises a longest match right output (LMRO) node 206 for transmitting the length of the longest prefix match found by the network packet search engines 102 to the right of the network packet search engine 102 or by the network packet search engine 102, whichever is longer, and a longest match left output (LMLO) node 208 for transmitting the length of the longest prefix match found by the network packet search engines 102 to the left of the network, packet search engine 102 or by the network packet search engine 102, whichever is longer.

The network packet search engine 102 also comprises a match valid node for each of the input and output nodes to indicate whether or not the data at the corresponding node is valid. Thus, the network packet search engine 102 comprises a match valid right input (MVRI) node 212 that corresponds to the LMRI node 202, a match valid left input (MVLI) node 214 that corresponds to the LMLI node 204, a match valid right output (MVRO) node 216 that corresponds to the LMRO node 206, and a match valid left output (MVLO) node 218 that corresponds to the LMLO node 208.

FIG. 3 is a flow diagram illustrating a method for providing cascaded trie-based network packet search engines 102 in accordance with one embodiment of the present invention. The method begins at step 300 where the network processing unit 104 sends a search command to each of the network packet search engines 102.

The search command comprises a retrieval command, an insertion command and/or any other suitable command which initiates a process to find a longest prefix match. Each search command comprises a specific search key. The retrieval command comprises a command to initiate a search for a longest prefix match within the network packet search engines 102 that may be used, for example, to identify a next hop address within one of the external memories 110 associated with the specific search key. The insertion command comprises a command to initiate a search for a longest prefix match within the network packet search engines 102 in order to select one of the network packet search engines 102 for storing the specific search key and its corresponding external memory 110 for storing a new address associated with the specific search key.

For the following steps (steps 302-308), it will be understood that these steps are performed by each of the network packet search engines 102 independently.

At step 302, a network packet search engines 102 searches its prefix table 200 for prefixes matching the specific search key. At decisional step 304, the network packet search engine 102 makes a determination regarding whether or not any matches were found. If no matches were found, the method follows the No branch from decisional step 304 to step 306. At step 306, the length of the longest prefix match is set to zero for that network packet search engine 102.

Returning to decisional step 304, if one or more matches were found, the method follows the Yes branch from decisional step 304 to step 308. At step 308, that network packet search engine 102 determines the length of its longest prefix match.

At step 310, each peripheral network packet search engine 102a transmits the length of its longest prefix match to its adjacent network packet search engine 102, which may be another peripheral network packet search engine 102a or a central network packet search engine 102b depending on the number of network packet search engines 102 in the processing system 100.

For the following steps (steps 312-328), it will be understood that these steps are performed by each of the network packet search engines 102 independently.

At step 312, a network packet search engine 102 receives longest match input data at one of the longest match input nodes (the LMRI node 202 or the LMLI node 204). The longest match input data comprises the length of the longest prefix match for one of the other network packet search engines 102, as described above in connection with FIG. 2. The network packet search engine 102 also receives match valid input data at the corresponding match valid input node (the MVRI node 212 or the MVLI node 214) that indicates that the longest match input data is valid.

At step 314, the network packet search engine 102 compares the longest match input data received at the longest match input node 202 or 204 to the length of its own longest prefix match. At decisional step 316, the network packet search engine 102 makes a determination regarding whether or not the longest match input data is greater than the length of its own longest prefix match. If the network packet search engine 102 determines that the longest match input data is greater than the length of its own longest prefix match, the method follows the Yes branch from decisional step 316 to step 318.

At step 318, the network packet search engine 102 transmits the longest match input data to an adjacent network packet search engine 102. This data is transmitted as longest match output data at the longest match output node 206 or 208 corresponding to the longest match input node 202 or 204 at which the longest match input data was received. Thus, if the longest match input data was received at the LMRI node 202, the data is transmitted as longest match output data at the LMRO node 206. Similarly, if the longest match input data was received at the LMLI node 204, the data is transmitted as longest match output data at the LMLO node 208.

In addition, the network packet search engine 102 also transmits match valid output data at the corresponding match valid output node (the MVRO node 216 or the MVLO node 218) that indicates that the longest match output data being transmitted is valid.

Returning to decisional step 316, if the network packet search engine 102 determines that the longest match input data is not greater than the length of its own longest prefix match, the method follows the No branch from decisional step 316 to step 320.

At step 320, the network packet search engine 102 transmits the length of its own longest prefix match to an adjacent network packet search engine 102. This data is transmitted as longest match output data at the longest match output node 206 or 208 corresponding to the longest match input node 202 or 204 at which the longest match input data was received. Thus, if the longest match input data was received at the LMRI node 202, the data is transmitted as longest match output data at the LMRO node 206. Similarly, if the longest match input data was received at the LMLI node 204, the data is transmitted as longest match output data at the LMLO node 208.

In addition, the network packet search engine 102 also transmits match valid output data at the corresponding match valid output node (the MVRO node 216 or the MVLO node 218) that indicates that the longest match output data being transmitted is valid.

At decisional step 322, the network packet search engine 102 makes a determination regarding whether or not all expected longest match input data has been received. Thus, the peripheral network packet search engines 102a determine whether or not longest match input data has been received from one adjacent network packet search engine 102 and the central network packet search engines 102b, if any, determine whether or not longest match input data has been received from two adjacent network packet search engines 102.

If all longest match input data has not been received, the method follows the No branch from decisional step 322 and returns to step 312 where the network packet search engine 102 receives longest match input data at one of the longest match input nodes. However, if all longest match input data has been received, the method follows the Yes branch from decisional step 322 to decisional step 324.

At decisional step 324, the network packet search engine 102 makes a determination regarding whether or not the length of its longest prefix match is greater than the length of any LPMs found by other network packet search engines 102. Thus, if the network packet search engine 102 determines that its longest prefix match is longer than all the longest match input data received from other network packet search engines 102, that network packet search engine 102 comprises the overall longest prefix match among the network packet search engines 102 and the method follows the Yes branch from decisional step 324 to step 326. In this way, any of the network packet search engines 102 may comprise the overall longest matching prefix independently of its position relative to the other network packet search engines 102.

At step 326, the network packet search engine 102 responds to the search command received from the network processing unit 104, at which point the method comes to an end. According to one embodiment, the network packet search engine 102 actively responds to the network processing unit 104. For this embodiment, if the search command comprises a retrieval command, the network packet search engine 102 uses its longest prefix match to retrieve data from the corresponding external memory 110 and transmits that data to the network processing unit 104. Similarly, if the search command comprises an insertion command, the network packet search engine 102 stores data from the network processing unit 104 in its corresponding external memory 110, in addition to storing the specific search key in its own prefix table 200.

According to another embodiment, the network packet search engine 102 passively responds to the network processing unit 104. For this embodiment, any one of the network packet search engines 102 may provide a "not ready" signal to the network processing unit 104 until one of the network packet search engines 102 determines that its longest prefix match is the overall longest prefix match in decisional step 324. Then, at step 326, that network packet search engine 102, which has stored its result (either data retrieved from the corresponding external memory 110 for a retrieval command or identifying itself as the location for storing a new prefix for an insertion command) in its output buffer, provides a "ready" signal to the network processing unit 104. Thus, for this embodiment, the network processing unit 104 may retrieve the data from the output buffer instead of having the data actively transmitted from the network packet search engine 102.

For this passive embodiment, the network packet search engine 102 that provides the "not ready" signal and the network packet search engine 102 that provides the "ready" signal, along with the appropriate data in its output buffer, are synchronized such that the hand-off from one to the other occurs during a clock cycle. This prevents the possibility of having either no network packet search engines 102 or multiple network packet search engines 102 trying to communicate with the network processing unit 104 at any one time.

Returning to decisional step 324, if the network packet search engine 102 determines that its longest prefix match is not longer than all the longest match input data received from other network packet search engines 102, the method follows the No branch from decisional step 324 to step 328. At step 328, the network packet search engine 102 may store a mock result in its output buffer as a position holder in order to ensure that correct result ordering is maintained, and the method comes to an end.

Although the present invention has been described with several embodiments, various changes and modifications may be suggested to one skilled in the art. It is intended that the present invention encompass such changes and modifications as fall within the scope of the appended claims.

What is claimed is:

1. A method for operating a network processing unit coupled to a plurality of network packet search engines, comprising:
   sending a search command from the network processing unit concurrently to each of the plurality of network packet search engines, the network packet search engines configured to operate concurrently using the search command; and
   receiving a response to the search command from a single one of the network packet search engines, the single network packet search engine comprising an overall longest prefix match among the plurality of network packet search engines independently of position relative to the other network packet search engines.

2. The method of claim 1, receiving a response to the search command comprising receiving an active response to the search command.

3. The method of claim 1, receiving a response to the search command comprising receiving a passive response to the search command.

4. The method of claim 1, wherein the search command comprises a specific search key that causes each network packet search engine to:
   determine a longest prefix match based on the specific search key; and
   determine whether its longest prefix match comprises the overall longest prefix match.

5. The method of claim 4, wherein the specific search key further causes at least one of the network packet search engines to store a mock result when its longest prefix match fails to comprise the overall longest prefix match.

6. The method of claim 1, wherein the network processing unit is coupled to at least one of the plurality of network packet search engines by a network processor unit interface.

7. The method of claim 1, wherein each network packet search engine is coupled to a corresponding external memory.

8. The method of claim 7, wherein the search command comprises an insertion command that causes at least one of the network packet search engines to store data from the network processing unit in that network packet search engine's corresponding external memory in response to the insertion command.

9. The method of claim 1, wherein the response to the search command comprises a hop address.

10. The method of claim 1, wherein the plurality of network packet search engines are coupled in parallel to the network processing unit and in series with each other, wherein each of the network packet search engines comprises a longest match input coupled to a longest match output of an adjacent network packet search engine.

11. A network processing unit operable to be coupled to a plurality of network packet search engines, the network processing unit operable to:
   send a search command concurrently to each of the plurality of network packet search engines, the network packet search engines configured to operate concurrently using the search command; and
   receive a response to the search command from a single one of the network packet search engines, the single network packet search engine comprising an overall longest prefix match among the plurality of network packet search engines independently of position relative to the other network packet search engines.

12. The network processing unit of claim 11, wherein the response to the search command is an active response.

13. The network processing unit of claim 11, wherein the response to the search command is a passive response.

14. The network processing unit of claim 11, wherein the search command comprises a specific search key that causes each network packet search engine to:
   determine a longest prefix match based on the specific search key; and
   determine whether its longest prefix match comprises the overall longest prefix match.

15. The network processing unit of claim 14, wherein the specific search key further causes at least one of the network packet search engines to store a mock result when its longest prefix match fails to comprise the overall longest prefix match.

16. The network processing unit of claim 11, further comprising:
   a network processor unit interface operable to couple the network processing unit to at least one of the plurality of network packet search engines.

17. The network processing unit of claim 11, wherein each network packet search engine is coupled to a corresponding external memory; and
   wherein the search command comprises an insertion command that causes at least one of the network packet search engines to store data from the network processing unit in that network packet search engine's corresponding external memory in response to the insertion command.

18. A system, comprising:
   a network processing unit;
   a plurality of network packet search engines coupled to the network processing unit;
   a plurality of memories, each memory coupled to a corresponding one of the plurality of network packet search engines; and
   a backplane coupled to the network processing unit;
   wherein the network processing unit is operable to:
      send a search command concurrently to each of the plurality of network packet search engines, the network packet search engines configured to operate concurrently using the search command; and
      receive a response to the search command from a single one of the network packet search engines, the single network packet search engine comprising an overall longest prefix match among the plurality of network packet search engines independently of position relative to the other network packet search engines.

19. The system of claim 18, wherein the search command comprises a specific search key that causes each network packet search engine to:
   determine a longest prefix match based on the specific search key; and
   determine whether its longest prefix match comprises the overall longest prefix match.

20. The system of claim 19, wherein the specific search key further causes at least one of the network packet search engines to store a mock result when its longest prefix match fails to comprise the overall longest prefix match.

21. The system of claim 18, wherein the search command comprises an insertion command that causes at least one of the network packet search engines to store data from the network processing unit in that network packet search engine's corresponding memory in response to the insertion command.

* * * * *